United States Patent
Kutscher et al.

(10) Patent No.: US 6,212,451 B1
(45) Date of Patent: Apr. 3, 2001

(54) PNEUMATIC SUSPENSION LEVELING SYSTEM FOR VEHICLES

(75) Inventors: Eberhard Kutscher, Dettenhausen; Joachim Lang, Grafenau; Gerhard Lohrmann, Asperg; Reiner Schneider, Dunningen; Udo Walter, Geislingen, all of (DE)

(73) Assignee: DaimlerChrysler AG (DE)

(*) Notice: Subject to any disclaimer, the term of this patent is extended or adjusted under 35 U.S.C. 154(b) by 0 days.

(21) Appl. No.: 09/271,131

(22) Filed: Mar. 17, 1999

(51) Int. Cl.[7] .............................. B60G 23/00; B62C 3/00; B62K 25/00
(52) U.S. Cl. ...................... 701/37; 280/5.501; 180/362
(58) Field of Search ............................ 701/37; 180/362; 280/5.5, 678, 124.157, 5.501

(56) References Cited

U.S. PATENT DOCUMENTS

| 4,967,360 | * | 10/1990 | Fukunaga et al. | 701/37 |
| 5,044,662 | * | 9/1991 | Kawabata | 280/707 |
| 5,110,152 | * | 5/1992 | Jones | 280/5.507 |
| 5,265,913 | * | 11/1993 | Scheffel | 280/840 |
| 5,968,102 | * | 10/1999 | Ichimaru et al. | 701/37 |

FOREIGN PATENT DOCUMENTS

| 43 33 591 A1 | 4/1995 | (DE). |
| 196 21 946 C1 | 9/1997 | (DE). |

\* cited by examiner

*Primary Examiner*—William A. Cuchlinski, Jr.
*Assistant Examiner*—Olga Hernandez
(74) *Attorney, Agent, or Firm*—Kenneth H. Maclean

(57) ABSTRACT

It is proposed that a pneumatic suspension leveling system for vehicles with a compressor which can be turned on and off by a control device in function of demand, which compressor only needs to operate intermittently, with predetermined on-time duration, during normal operation, be improved with respect to its functional capacity.

This problem is solved in accordance with the invention in that the control device of the pneumatic suspension leveling system varies the on-time duration of the compressor in function of the heat transfer conditions which prevail between the compressor and the air enveloping the latter.

6 Claims, 1 Drawing Sheet

PNEUMATIC SUSPENSION LEVELING SYSTEM FOR VEHICLES

BACKGROUND OF THE INVENTION

1. Field of the Invention

The invention concerns a pneumatic suspension leveling system for vehicles, in particular for motor vehicles, with a selectively activated air compressor having a pumping capacity more than sufficient for normal demands of the suspension leveling system. Such a pneumatic suspension leveling system is known to the art, for example, from DE 196 21 946 C1.

2. Description of Related Art

Pneumatic suspension leveling systems for motorized vehicles such as, e.g., trucks and their trailers as well as buses, are fundamentally known to the art and are utilized on a mass-production basis. They serve vehicle suspension and are additionally used for vehicle level adjustment. With some designs of pneumatic suspension leveling systems of this kind, a pressure accumulator is provided between the compressor outlet and the suspension leveling devices and which is constantly maintained at a boost pressure which lies distinctly above the operating pressures of the pneumatic suspension leveling elements and/or air suspension bellows. With such a pneumatic suspension leveling system the compressor operates as a rule only when the pressure accumulator must be recharged, in which case compressor output can be below peak capacity during peak pneumatic suspension leveling system demand because an adequate pressure supply is always assured by the pressure accumulator.

When using electrically driven compressors, the compressor heats up markedly during with continuous operation over longer periods of time, which leads to compressor overload and damage and, consequently, can lead to pneumatic suspension leveling system failure. In order to prevent compressor overload of this kind, a predetermined maximum on-time is prescribed by an electronic control device of the pneumatic suspension leveling system.

During compressor operation, a distinction is made between relative on-time duration and an absolute on-time duration. Relative on-time duration indicates the proportion of the on-time of an operating period, whereby this operating period is composed of the off-time and an off-time which must be maintained between two successive on-times. For example, a relative on-time duration $ED_{Tel}$ of 20% means that an off-time of 40 seconds must first follow an on-time of, e.g., 10 seconds before the compressor may be switched on again. In the aforementioned example, the operating period turns out to be 50 seconds, the sum of the on-time (10 seconds) and off-time (40 seconds).

In contrast thereto, the absolute on-time duration determines the maximum on-time which the compressor may be allowed to operate without interruption (off-time). The speed with which the compressor heats up during its operation is a function of different limiting conditions such as, for example, mounting position of the compressor on the vehicle, air temperature, compressor air flow charging speed. The operating conditions resulting from these limiting conditions for the compressor can delay or accelerate compressor heating.

The relative on-time duration and the absolute on-time duration preset in the control device of pneumatic suspension leveling systems known to the art can lead to unfavorable operating conditions for the compressor in order to prevent exceedingly short off-times and, consequently, can result in overheating of the compressor during unfavorable operating conditions. However, operation of this design with relatively long off-times does not provide sufficient pumping capacity for operating the pneumatic suspension leveling system.

SUMMARY OF THE INVENTION

The present invention concerns itself with the problem of improving the functional capacity of a pneumatic suspension leveling system of the kind designated above with the aid of simple technical measures.

The invention is based on the concept of selectively varying the compressor on-time (relative and absolute), whereby the current on-time duration in each case is matched to prevailing compressor operating conditions. The functional parameter for determine a desirable compressor on-time duration is varied are the heat transfer conditions which prevail between the compressor and the air enveloping the latter.

The heat transfer conditions prevailing between the compressor and the air enveloping the latter can depend to a large extent on the air temperature and air flow speed prevailing in the compressor environment. With a preferred special embodiment of the pneumatic suspension leveling system in accordance with the invention, therefore, the control device is able to vary the on-time duration of the compressor as a function of the air temperature and air flow speed prevailing in the compressor environment. Preferably, on-time duration is decreased when air temperature increases and/or air flow speed decreases and is increased when air temperature decreases and/or air flow speed increases.

With a preferred special embodiment of the pneumatic suspension leveling system in accordance with the invention the control device can determine the air temperature prevailing in the compressor environment on the basis of current outside vehicle temperature and/or current vehicle engine air-intake temperature. These temperatures are preferably detected by an appropriate sensory mechanism, whereby signal values correlating thereto are generated, which the control device processes to determine air temperature in the compressor environment. Accordingly, air temperature in the compressor environment is not measured directly in this compressor environment but, rather, is indirectly determined with the aid of a corresponding, modeling analysis based on the outside vehicle temperature and vehicle engine air-intake temperature. In this manner, recourse can be made in particular to sensory mechanism already existing on the vehicle with which said temperatures are measured in any case. Preferably, the control device operates in tandem with an electronic motor control already existing on the vehicle or incorporated therein, such that, for example, the corresponding signal lines of the sensory mechanism can be co-utilized.

With an advantageous special embodiment of the pneumatic suspension leveling system according to the invention, the control device can determine the air flow speed prevailing in the compressor environment on the basis of the current vehicle speed, whereby, preferably, recourse can again be made to the vehicle's already existing sensory mechanism and motor control.

BRIEF DESCRIPTION OF THE DRAWING

Additional important characteristics and advantages of the pneumatic suspension leveling system in accordance with the invention result from the subclaims, from the drawing and from the following description of a preferred exemplified embodiment based on the drawing.

DESCRIPTION OF A PREFERRED EMBODIMENT

Figure 1:
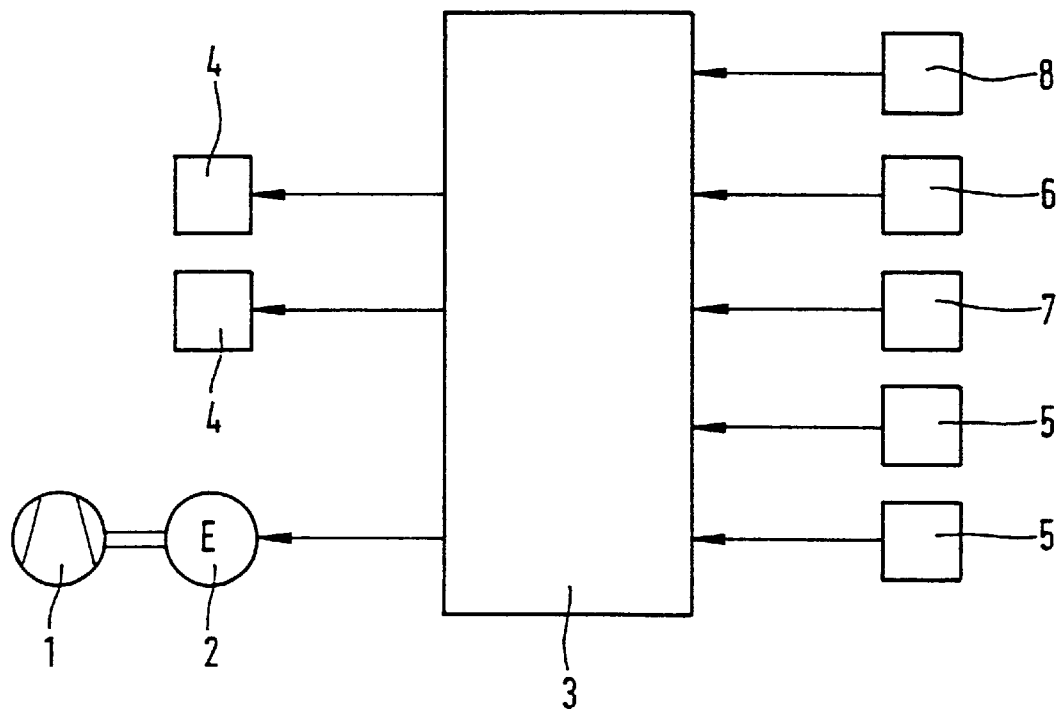
FIG. 1 shows a partial representation of a pneumatic suspension leveling system in the form of a circuit diagram.

A pneumatic suspension leveling system not shown in greater detail has a compressor 1 which is driven by an electromotor 2. This motor 2 is turned on and off automatically, as a function of parameters, by a preferably computer-aided control device 3 which also actuates the control units of values 4 not depicted in greater detail of the pneumatic suspension leveling system.

Transmitters 5 which, for example, determine the vertical distances between a vehicle body and vehicle wheels and, thereby, body level, are connected to the control circuit 3 such that the control device is able, through a corresponding variance comparison, to set and maintain a desired suspension level by turning the electromotor 2 and, consequently, the compressor 1 on and off as needed and by actuating the values 4.

Additionally, the control device 3 is connected to a first temperature sensor 6 with which outside vehicle temperature $T_{At}$ is detected and a corresponding signal $S_{AT}$ is generated and routed to the control device 3. Furthermore, a second temperature sensor 7 is connected to the control device 3 which detects the vehicle engine air-intake temperature $T_{FT}$ and generates a signal value correlating thereto and makes the latter available to the control device 3. Moreover, a signal transmitter 8 is connected input-side to the control device 3 which generates a signal value $S_{FG}$ correlating to the vehicle speed $G_{FG}$ and routes the latter to the control device 3.

On the basis of conceptual models it is now possible for the control device 3 to calculate a signal value $S_{LT}$ from the signal values $S_{AT}$ and $S_{FT}$ made available to it which correlate to the outside vehicle temperature $T_{AT}$ and to the vehicle engine air-intake temperature $T_{FT}$ which correlates to the air temperature in the compressor vicinity. Likewise, with corresponding conceptual models a signal value $S_{LG}$ can be calculated from the signal value $F_{FG}$ correlating to the vehicle speed $G_{FG}$ which correlates to the air flow speed $G_{LG}$ in the compressor environment. Such conceptual models can, for example, be based on linear relationships. The influence of (vehicle) outside air temperature $T_{AT}$ on air temperature $T_{LT}$ in the compressor vicinity can, for example, be described as follows:

$$EF_{AT}=K_{AT}-T_{AT}\bullet S_{AT},$$

in which:

$EF_{AT}$=influence factor of outside air temperature, $K_{AT}$=linear equation constant for the outside air temperature influence, $T_{AT}$=outside air temperature and $S_{AT}$=linear equation slope for the outside air temperature influence.

With a specific vehicle type and a specific compressor type, a value for the constant $K_{AT}$=1.5 and for slope $S_{AT}$=0.025 has proven useful.

For the influence of vehicle engine air-intake temperature $T_{FT}$ on air temperature $T_{LT}$ in the compressor environment, for example, the following relationship, for instance, applies:

$$EF_{FT}=K_{FT}-T_{FT}\bullet S_{FT},$$

in which $EF_{FT}$=influence factor of vehicle engine air-intake temperature, $K_{FT}$=linear equation constant for the vehicle engine air-intake temperature, $T_{FT}$=vehicle engine air-intake temperature and $S_{FT}$=linear equation slope for the vehicle engine air-intake temperature influence.

For the aforementioned vehicle type and compressor type, the following values have proven useful for the equation constant and slope for the influence of vehicle engine air-intake temperature: $K_{FT}$=1.75 and $S_{FT}$=0.0125.

Finally, for consideration of the influence of the vehicle speed $G_{FG}$ on the air flow speed $G_{LG}$ the following equation, for instance, is taken as a basis:

$$EF_{FG}=K_{FG}+G_{PG}\bullet S_{FG},$$

in which $EF_{FG}$=influence factor of vehicle speed, $K_{FG}$=linear equation constant for the influence of vehicle speed, $T_{FG}$=vehicle speed and $S_{FG}$=linear equation slope for the vehicle speed influence.

The preferred values for the aforementioned vehicle type and compressor type for the linear slope and linear constant are as follows: $K_{FG}$=0.5 and $S_{FG}$=0.01.

The relative and absolute on-time ED is now determined by the control device 3 in analogy to the following equation:

$$ED = ED_{Basis} \bullet \frac{a_{AT} \cdot EF_{AT} + a_{FT} \cdot EF_{FT} + a_{FG} \cdot EF_{FG}\bullet}{a_{AT} + a_{FT} + a_{FG}},$$

in which:

ED=calculated on-time duration, $ED_{Basis}$=base on-time duration with specific vehicle operating parameters, $EF_{AT}$=influence factor of outside vehicle temperature $T_{AT}$, $EF_{FT}$=influence factor of vehicle engine air-intake temperature $T_{FT}$, $EF_{FG}$=influence factor of vehicle speed $G_{FG}$, $a_{AT}$=weighting factor for influence of outside air temperature $T_{AT}$, $a_{FT}$=weighting factor for influence of vehicle engine air-intake temperature $T_{FT}$ and $a_{FG}$=weighting factor for influence of vehicle speed $G_{FG}$.

The following values, for example, are possible as vehicle reference or starting operating parameters or as environmental conditions of compressor operation with which base on-time duration $ED_{Basis}$ is determined: $G_{FG}$=50 km/h at $T_{AT}$=20° C. and $T_{FT}$=60° C.

An essential advantage of the pneumatic suspension leveling system in accordance with the invention is to be seen in the fact that the on-time duration (relative and absolute) of the compressor 1 is matched to the operating conditions prevailing in the compressor environment, that is—as shown—preferably the air temperature and air flow speed in the compressor vicinity. Preferably an already existing sensory mechanism on the vehicle can be used. Additionally, the control device 3 used for the processing of these signal values and for output of the corresponding on-time duration ED can be integrated into an electronic, computer-aided motor control already existing on the vehicle. Hence, the pneumatic suspension leveling system designed according to the invention can be implemented economically and without installation outlay in vehicles which are already equipped with a conventional pneumatic suspension leveling system. The pneumatic suspension leveling system in accordance with the invention can consequently be retrofitted in a particularly simple manner.

We claim:

1. In an improved vehicle pneumatic suspension leveling system having pneumatic suspension leveling elements assigned to vehicle wheels and axles, and having a compressor with a predetermined on-time duration and with sufficient capacity to be selectively operated intermittently during normal operation of the pneumatic suspension leveling system, and having an electronic control device for activating and deactivating the compressor, the improvement comprising: a sensor for producing an input signal to the electronic control unit responsive to changes in the rate of heat transfer from the compressor to the air about the compressor wherein an increase in the rate of heat transfer corresponds to an increased on-time duration (ED) of the compressor.

2. The improved vehicle pneumatic suspension leveling system as set forth in claim 1 in which the sensor is responsive to changes in air temperature and in vehicle speed so that a decrease in air temperature and an increase in vehicle speed produces an increase in the compressor on-time duration (ED) in accord with an increased rate of heat transfer from the compressor to its surroundings resulting from a decreased air temperature and an increased air flow about the compressor.

3. In an improved vehicle pneumatic suspension leveling system having pneumatic suspension leveling elements assigned to vehicle wheels and axles, and having a compressor with a predetermined on-time duration and with sufficient capacity to be selectively operated intermittently during normal operation of the pneumatic suspension leveling system, and having an electronic control device for activating and deactivating the compressor, the improvement comprising: a sensor for producing an input signal to the electronic control unit responsive to changes in air temperature and in vehicle speed so that a decrease in air temperature produces an increase in the compressor on-time (ED) and an increase in vehicle speed produces an increase in the compressor on-time (ED) wherein air temperature prevailing in the compressor environment is determined by sensing the temperature of air entering the inlet of the vehicle engine and wherein the rate of air flow about the compressor is determined by sensing the speed of the associated vehicle.

4. The improved pneumatic leveling system as set forth in claim 3 in which the on-time duration of the compressor is calculated the equation as follows:

$$ED = ED_{Basis} \cdot \frac{a_{AT} \cdot EF_{AT} + a_{FT} \cdot EF_{FT} + a_{FG} \cdot EF_{FG}}{a_{AT} + a_{FT} + a_{FG}},$$

$$ED = ED_{Basis} \cdot \frac{a_{AT} \cdot EF_{AT} + a_{FT} \cdot EF_{FT} + a_{FG} \cdot EF_{FG}}{a_{AT} + a_{FT} + a_{FG}},$$

in which:

ED=calculated on-time duration, $ED_{Basis}$=base on-time duration with predetermined vehicle operating parameters, $EF_{AT}$=influence factor of outside vehicle temperature ($T_{AT}$), $EF_{FT}$=influence factor of vehicle engine air-intake temperature ($T_{FT}$), $EF_{FG}$=influence factor of vehicle speed ($G_{FG}$), $a_{AT}$=weighting factor for influence of outside air temperature ($T_{AT}$), $a_{FT}$=weighting factor for influence of vehicle engine air-intake temperature ($T_{FT}$) and $a_{FG}$=weighting factor for influence of vehicle speed ($G_{FG}$)

$$ED = ED_{Basis} \cdot \frac{a_{AT} \cdot EF_{AT} + a_{FT} \cdot EF_{FT} + a_{FG} \cdot EF_{FG}}{a_{AT} + a_{FT} + a_{FG}},$$

5. The improved pneumatic leveling system as set forth in claim 4 in which the factor for outside air temperature ($EF_{AT}$), the factor for vehicle engine air intake temperature ($EF_{FT}$), and the factor for vehicle speed ($EF_{FG}$) correspond to values calculated by the following equations:

that the influence factor for outside air temperature ($EF_{AT}$), the influence factor for vehicle engine air-intake temperature ($EF_{FT}$) and the influence factor for vehicle speed ($EF_{FG}$) correspond to values calculated in analogy to the equations:

$$EF_{AT} = K_{AT} - T_{AT} \bullet S_{AT},$$

$$EF_{FT} = K_{FT} - T_{FT} \bullet S_{FT},$$

$$EF_{FG} = K_{FG} + G_{FG} \bullet S_{FG},$$

in which:

$T_{AT}$=current (vehicle) outside temperature, $T_{FT}$=current vehicle engine air-intake temperature, $G_{FG}$=current vehicle speed, K=constant of the respective equation, S=slope of the respective equation.

6. The improved pneumatic leveling system as set forth in claim 5 in which the constants (K) and the slopes (S) of the equations exhibit following values:

$K_{AT}$=1.5 $S_{AT}$=0.025

$K_{FT}$=1.75 $S_{FT}$=0.0125

$K_{FG}$=0.5 $S_{FG}$=0.01.

* * * * *